(12) United States Patent
Kageyama et al.

(10) Patent No.: US 9,802,550 B2
(45) Date of Patent: Oct. 31, 2017

(54) ON-VEHICLE CAMERA MOUNTING STRUCTURE

(71) Applicant: TOYOTA JIDOSHA KABUSHIKI KAISHA, Toyota-shi, Aichi-ken (JP)

(72) Inventors: Shioya Kageyama, Ebina (JP); Ryoma Shirai, Toyota (JP); Ryo Iwamatsu, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 15/059,672

(22) Filed: Mar. 3, 2016

(65) Prior Publication Data

US 2016/0257265 A1    Sep. 8, 2016

(30) Foreign Application Priority Data

Mar. 5, 2015    (JP) .................. 2015-043455

(51) Int. Cl.
*A47F 5/00* (2006.01)
*B60R 11/04* (2006.01)
*B60R 11/00* (2006.01)

(52) U.S. Cl.
CPC ....... *B60R 11/04* (2013.01); *B60R 2011/0026* (2013.01)

(58) Field of Classification Search
USPC ....................................................... 248/208
See application file for complete search history.

(56) References Cited

U.S. PATENT DOCUMENTS

| 3,343,772 | A | * | 9/1967 | Howell | 248/205.5 |
| 3,928,894 | A | * | 12/1975 | Bury | B60R 1/04 24/304 |
| 5,576,687 | A | * | 11/1996 | Blank | B60K 35/00 340/438 |
| 6,010,102 | A | * | 1/2000 | Dillion, Jr. | B60R 11/00 248/206.3 |
| 6,170,955 | B1 | * | 1/2001 | Campbell | B60R 11/04 248/208 |
| 6,799,904 | B2 | * | 10/2004 | Schaefer | B60R 11/04 348/148 |
| 7,322,755 | B2 | * | 1/2008 | Neumann | B60R 11/04 348/148 |
| 7,480,149 | B2 | * | 1/2009 | DeWard | B60R 11/04 340/438 |
| 8,356,948 | B2 | * | 1/2013 | Onishi | B60R 11/04 396/419 |
| 8,405,726 | B2 | * | 3/2013 | Schofield | B60R 1/04 348/148 |
| 8,570,374 | B2 | * | 10/2013 | Betham | B60R 11/04 348/148 |

(Continued)

FOREIGN PATENT DOCUMENTS

| JP | 2013-151291 A | 8/2013 |
| JP | 2013-193558 A | 9/2013 |

(Continued)

*Primary Examiner* — Monica Millner
(74) *Attorney, Agent, or Firm* — Andrews Kurth Kenyon LLP (57) ABSTRACT

An on-vehicle camera mounting structure includes a bracket arranged on a window, and a spring part that is arranged in the bracket and applies force in a direction towards the window onto the on-vehicle camera.

2 Claims, 6 Drawing Sheets

(56) References Cited

U.S. PATENT DOCUMENTS

| | | | | |
|---|---|---|---|---|
| 8,636,393 B2* | 1/2014 | Schofield | ............. | B60Q 1/1423 |
| | | | | 362/464 |
| 8,897,633 B2* | 11/2014 | Okuda | ................. | G03B 17/565 |
| | | | | 396/25 |
| 9,193,308 B2* | 11/2015 | Okuda | .................... | B60R 11/04 |
| 2009/0295181 A1* | 12/2009 | Lawlor | .................... | B60R 1/12 |
| | | | | 296/1.11 |
| 2011/0233248 A1 | 9/2011 | Flemming et al. | | |
| 2015/0109447 A1* | 4/2015 | Okuda | .................... | B60R 11/04 |
| | | | | 348/148 |
| 2016/0257261 A1* | 9/2016 | Kageyama | .............. | B60R 11/02 |

FOREIGN PATENT DOCUMENTS

| | | |
|---|---|---|
| JP | 2015-152489 A | 8/2015 |
| WO | 2013/141000 | 9/2013 |

\* cited by examiner

ON-VEHICLE CAMERA MOUNTING STRUCTURE

INCORPORATION BY REFERENCE

The disclosure of Japanese Patent Application No. 2015-043455 filed on Mar. 5, 2015 including the specification, drawings and abstract is incorporated herein by reference in its entirety.

BACKGROUND OF THE INVENTION

1. Field of the Invention

The invention relates to an on-vehicle camera mounting structure.

2. Description of Related Art

Conventionally, a carrier device described in Japanese Patent Application Publication No. 2013-151291 (JP 2013-151291 A) is known as a technology related to a mounting structure for mounting an on-vehicle camera on a vehicle window. The carrier device described in JP 2013-151291 A is provided with a carrier plate (bracket) that is able to be fixed to a vehicle-interior side of the window. The carrier plate supports an on-vehicle camera. A spring part arranged in the carrier plate applies force onto the on-vehicle camera in a direction away from the window.

In the related art, the spring part is interposed between the bracket and the on-vehicle camera, and a space between the bracket and the on-vehicle camera can be expanded. As the space is expanded, the on-vehicle camera is separated from the window. This makes the on-vehicle camera susceptible to light as disturbance from the vehicle interior because, for example, light traveling towards the window from an instrument panel and so on is reflected by the window on the on-vehicle camera more easily.

SUMMARY OF THE INVENTION

The invention provides an on-vehicle camera mounting structure that restrains an influence of light as a disturbance from a vehicle interior on an on-vehicle camera.

An on-vehicle camera mounting structure according to an aspect of the invention includes a bracket arranged in a window, and a spring part that is arranged in the bracket and applies force in a direction towards the window onto the on-vehicle camera.

In the on-vehicle camera mounting structure, the spring part applies force in the direction towards the window onto the on-vehicle camera, thereby bringing the on-vehicle camera closer to the window. Thus, it is possible to restrain the on-vehicle camera from being separated from the window. It becomes possible to restrain an influence of light as a disturbance from vehicle interior on the on-vehicle camera.

In the above aspect, the bracket includes a first wall part that extends in a direction orthogonal to the window, and a second wall part that is provided in an end part of the first wall part on a vehicle-interior side, extends along the window, and is positioned on the vehicle-interior side of the on-vehicle camera. The spring part may be arranged between the on-vehicle camera and the second wall part. With such a structure, it is possible to concretely realize the foregoing operation, namely, the spring part applying force in the direction towards the window onto the on-vehicle camera.

In the foregoing aspect, the bracket includes a confronting part that is fixed to the window on the vehicle-interior side, faces the window, and extends along the window.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention are explained below in detail by using the drawings. In the explanation below, identical or corresponding elements are designated by the same reference numerals, and duplicate description is omitted.

Figure 1A:
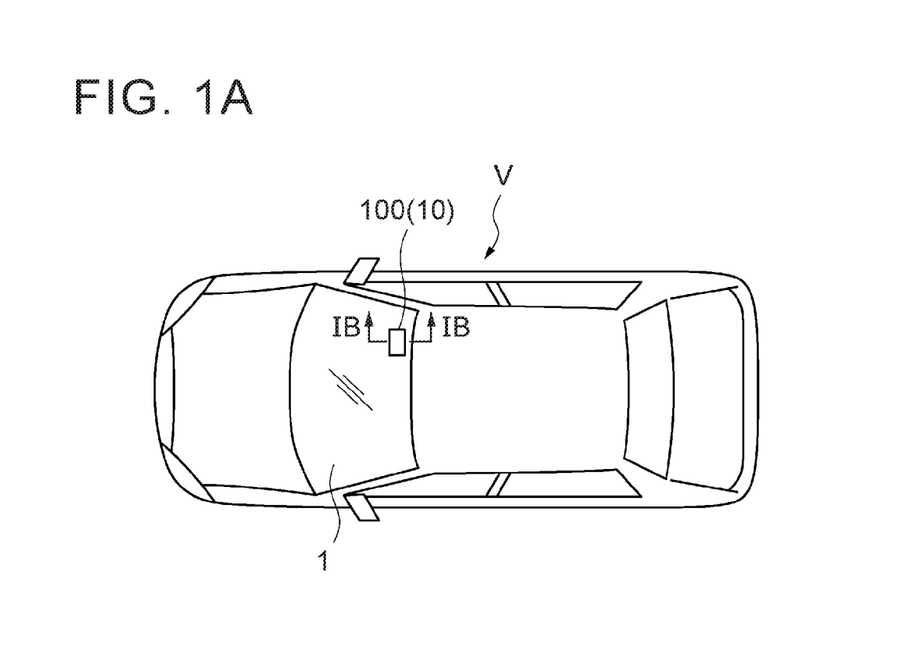
FIG. 1A is a view of an on-vehicle camera mounting structure according to an embodiment of the invention.
Figure 1B:
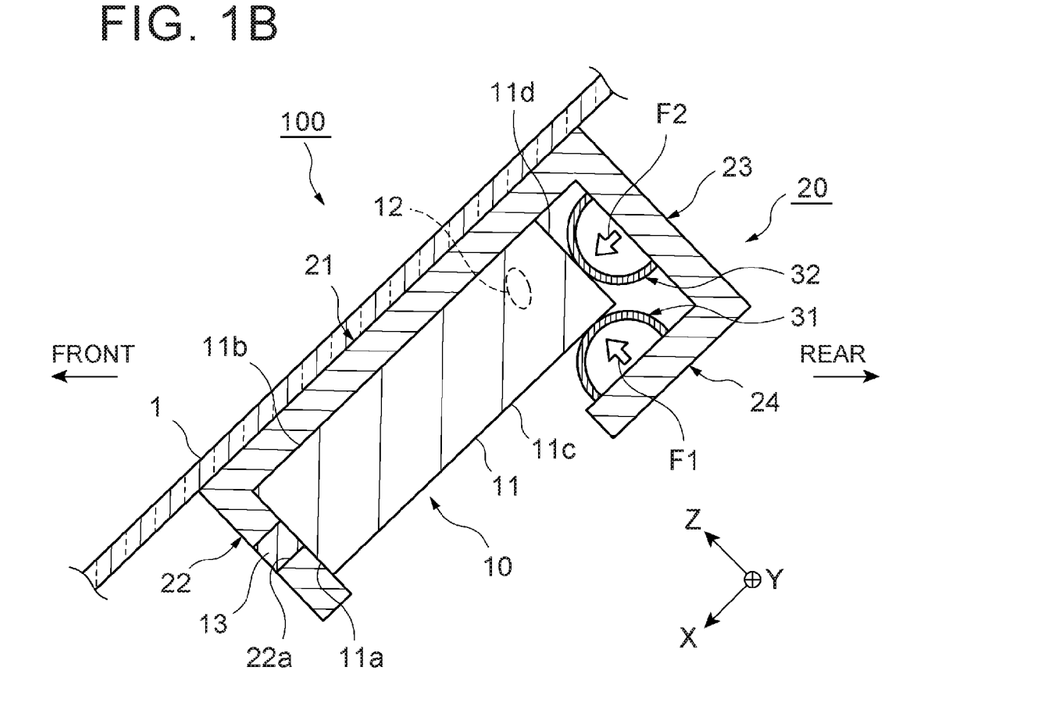
FIG. 1B is a view of the on-vehicle camera mounting structure according to the embodiment of the invention.

FIG. 1A is a rough plan view of a vehicle V provided with an on-vehicle camera mounting structure 100 according to the first embodiment. FIG. 1B is a sectional view taken along the line IB-IB in FIG. 1A. As shown in FIG. 1A, the on-vehicle camera mounting structure 100 is a mounting structure for mounting an on-vehicle camera 10 on a window 1 of the vehicle V such as an automobile. The on-vehicle camera mounting structure 100 is provided with a bracket 20 that houses and holds the on-vehicle camera 10. The bracket 20 includes at least a confronting part 21, a front wall part 22, a rear wall part 23, and a vehicle-interior side supporting part 24.

In the following explanation, a direction towards the window 1 is referred to as Z direction, a direction that is orthogonal to Z direction and in parallel to a vehicle width direction of the vehicle V is referred to as Y direction, and a direction orthogonal to both Y direction and Z direction is referred to as X direction. The X direction is a direction away from the rear wall part 23. X direction is a direction orthogonal to the vehicle width direction and along the window 1. Y direction is a horizontal direction along the window. Z direction is a direction along a thickness direction of the window 1. Z direction is a direction perpendicular to the window 1. Z direction is a direction from the vehicle interior (inside of the vehicle V) to the vehicle exterior (outside of the vehicle V).

The on-vehicle camera 10 captures an image of the vehicle exterior through the window 1 and acquires image data. The on-vehicle camera 10 processes the image data acquired and outputs a result of the processing. The on-vehicle camera 10 is, for example, an on-vehicle sensor applied to a preventive safety system. The on-vehicle camera 10 is applied to, for example, a white line recognition system for recognizing white road lines, an obstacle recognition system that recognizes obstacles around a vehicle, and so on. The on-vehicle camera 10 may be a monocular camera or a stereo camera.

In this embodiment, a windshield is applied as the window 1, and the on-vehicle camera 10 captures an image of the front of the vehicle V. A side glass may be applied as the window 1. In this case, the on-vehicle camera 10 captures an image of a side of the vehicle V. A rear glass may be applied as the window 1. In this case, the on-vehicle camera 10 captures an image of the rear of the vehicle V.

The on-vehicle camera 10 has a camera housing 11 and an optical system 12 such as a lens. In the on-vehicle camera 10, light from the vehicle exterior transmitted through the window 1 enters an imaging device through the optical system 12. As the imaging device, for example, a CCD (charge coupled device) or a CMOS (complementary metal oxide semiconductor) is used. In a case where black ceramic lines are pasted onto the window 1, the ceramic line is provided with a cutout (a part where no ceramic line is pasted) in a field angle range of the on-vehicle camera 10. The camera housing 11 is provided with a projection 13 projecting on the vehicle front side (herein after, simply referred to as a "front side") along X direction. The projection 13 is engaged with (fitted into) the bracket 20. The projection 13 is provided on a side surface 11a of the camera housing 11 on the front side.

The bracket 20 is fixed to the window 1 on a vehicle-interior side (a side opposite to the Z direction). The bracket 20 is fixed to a surface of the window 1 on the vehicle-interior side by adhesion. A method for fixing the bracket 20 to the window 1 is not limited to adhesion, and publicly known methods may be used.

The confronting part 21 faces the window 1. The confronting part 21 extends along the window 1. The confronting part 21 has a plate shape. The confronting part 21 is fixed to the surface of the window 1 on the vehicle-interior side by adhesion. A surface of the confronting part 21 on the vehicle-interior side abuts on (comes into contact with) the on-vehicle camera 10. The confronting part 21 abuts on a side surface 11b of the on-vehicle camera 10 on the vehicle-exterior side. An opening (not shown) is formed in the confronting part 21 at least in a field angle range of the on-vehicle camera 10, and the opening goes through a front surface and a back surface of the confronting part 21.

The front wall part 22 is provided in an end part of the confronting part 21 on the front side. The front wall part 22 is provided so as to be perpendicular to the confronting part 21. The front wall part 22 is provided so as to project from the confronting part 21 to the vehicle-interior side. The front wall part 22 extends along Y direction. The front wall part 22 faces the on-vehicle camera 10 in X direction. A surface of the front wall part 22 on a vehicle rear side (herein below, simply referred to as a "rear side") in a direction along X direction abuts on the on-vehicle camera 10. The front wall part 22 supports the on-vehicle camera 10 in X direction.

The front wall part 22 is provided with a through hole 22a in which the projection 13 of the on-vehicle camera 10 is inserted. The through hole 22a has a sectional shape corresponding to a sectional shape of the projection 13 of the on-vehicle camera 10. The through hole 22a is fitted to the projection 13 of the on-vehicle camera 10. In the through hole 22a, the projection 13 of the on-vehicle camera 10 is press-fitted. Thus, in directions other than the projecting direction of the projection 13, the on-vehicle camera 10 is positioned with respect to the bracket 20. An inner surface of the through hole 22a supports the on-vehicle camera 10 through the projection 13 in Z direction.

The rear wall part 23 is provided in an end part of the confronting part 21 on the rear side. The rear wall part 23 is provided so as to be perpendicular to the confronting part 21. The rear wall part 23 is provided so as to project from the confronting part 21 to the vehicle-interior side. The rear wall part 23 extends along Y direction. The rear wall part 23 faces the on-vehicle camera 10 in X direction. Further, the rear wall part 23 faces the front wall part 22 through the on-vehicle camera 10. The rear wall part 23 of the on-vehicle camera mounting structure 100 structures a first wall part.

The vehicle-interior side supporting part 24 is provided in an end part (distal end part) of the rear wall part 23 on the vehicle-interior side. The vehicle-interior side supporting part 24 is provided so as to be perpendicular to the rear wall part 23. The vehicle-interior side supporting part 24 has a plate shape extending along the confronting part 21. The vehicle-interior side supporting part 24 extends along the confronting part 21 and is positioned on the vehicle-interior side of the on-vehicle camera 10. The vehicle-interior side supporting part 24 structures a second wall part. The vehicle-interior side supporting part 24 faces the confronting part 21 through the on-vehicle camera 10. The vehicle-interior side supporting part 24 supports the on-vehicle camera 10 in Z direction through a later-described first spring part 31.

The on-vehicle camera mounting structure 100 is provided with a first spring part (spring part) 31 and a second spring part 32. The first spring part 31 is arranged between the on-vehicle camera 10 and the vehicle-interior side supporting part 24. The first spring part 31 is fixed to the vehicle-interior side supporting part 24. The first spring part 31 is provided in a surface of the vehicle-interior side supporting part 24 on the vehicle-exterior side (Z direction side) so as to be able to deform elastically along Z direction.

The first spring part 31 is sandwiched between the on-vehicle camera 10 and the vehicle-interior side supporting part 24, and is elastically deformed so as to be crushed in Z direction. The first spring part 31 applies force F1 in Z direction, which is restoring force (elastic force) in accordance with the elastic deformation, onto the on-vehicle camera 10. The first spring part 31 applies force F1 in a direction intersecting with the window 1 onto a side surface 11c of the camera housing 11 on the vehicle-interior side. Force F1 is pressing force for pressing the on-vehicle camera 10 to the window 1 side. The first spring part 31 applies force F1 in Z direction onto the on-vehicle camera 10, thus bringing the on-vehicle camera 10 closer to the confronting part 21. The first spring part 31 also applies force in a direction away from the window 1 (force directed from the vehicle exterior to the vehicle interior) onto the vehicle-interior side supporting part 24 as reaction force of force F1 applied to the on-vehicle camera 10.

In the illustrated example, the first spring part 31 presses an end part of the side surface 11c of the camera housing 11 on the rear side against the confronting part 21. Specifically, the first spring part 31 presses a part of the side surface 11c of the camera housing 11, which corresponds to the optical system 12, against the confronting part 21.

The second spring part 32 is arranged between the on-vehicle camera 10 and the rear wall part 23. The second spring part 32 is fixed to the rear wall part 23. The second spring part 32 is arranged on a surface of the rear wall part 23 on the front side so as to be able to deform elastically along X direction.

The second spring part 32 is sandwiched between the on-vehicle camera 10 and the rear wall part 23, and is deformed elastically so as to be crushed in X direction. The second spring part 32 applies force F2 in X direction, which is restoring force (elastic force) in accordance with the elastic deformation, onto the on-vehicle camera 10. The second spring part 32 applies force F2, which is pressing force for pressing the on-vehicle camera 10 in X direction, onto a side surface 11d of the camera housing 11 on the rear side. The second spring part 32 applies force F2 in X direction onto the on-vehicle camera 10, thereby pressing the on-vehicle camera 10 against the front wall part 22. The second spring part 32 also applies force in a direction towards the rear wall part 23 (force in a direction opposite to X direction, or force from the front wall part 22 towards the rear wall part 23) onto the rear wall part 23 as reaction force of force F2 applied to the on-vehicle camera 10.

As the first spring part 31 and the second spring part 32, resin-made plate springs are used. For example, the first spring part 31 and the second spring part 32 are formed from a material with lower thermal conductivity than that of the bracket 20. Thus, heat transmitted from the window 1 to the on-vehicle camera 10 through the bracket 20 is restrained.

Materials and shapes of the first spring part 31 and the second spring part 32 are not particularly limited. The first spring part 31 and the second spring part 32 may be made from, for example, metal. The first spring part 31 and the second spring part 32 may also be, for example, a coil spring, a cantilever spring, a disk spring, a leaf spring, and so on. The first spring part 31 and the second spring part 32 are mechanical structures that accumulate elastic energy by using restoring force of elastic bodies. Various kinds of spring parts may be used as the first spring part 31 and the second spring part 32 as long as they are able to apply force F1 and force F2 by being elastically deformed.

In this embodiment, a spring part, which applies force onto the on-vehicle camera 10 in a direction away from the window 1, is not provided between the on-vehicle camera 10 and the confronting part 21. As stated earlier, the confronting part 21 and the side surface 11b of the camera housing 11 of the on-vehicle camera 10 abut on each other.

Figures 2A, 2C:
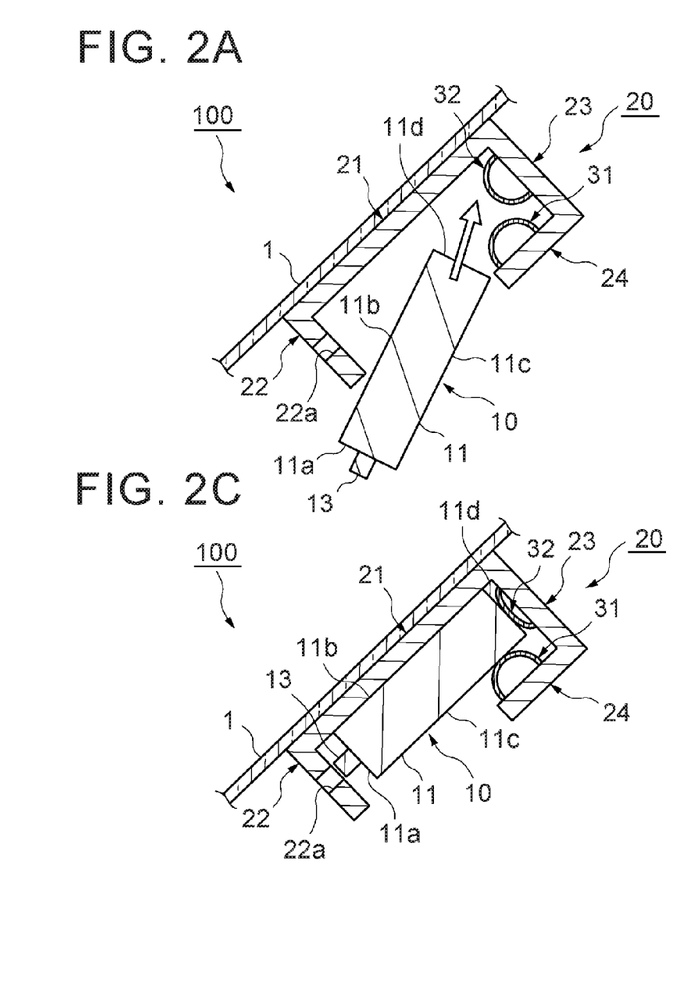
FIG. 2A is a view explaining a method for mounting the on-vehicle camera using the on-vehicle camera mounting structure shown in FIG. 1B.
FIG. 2C is a view explaining the method for mounting the on-vehicle camera using the on-vehicle camera mounting structure shown in FIG. 1B.
Figure 2B:
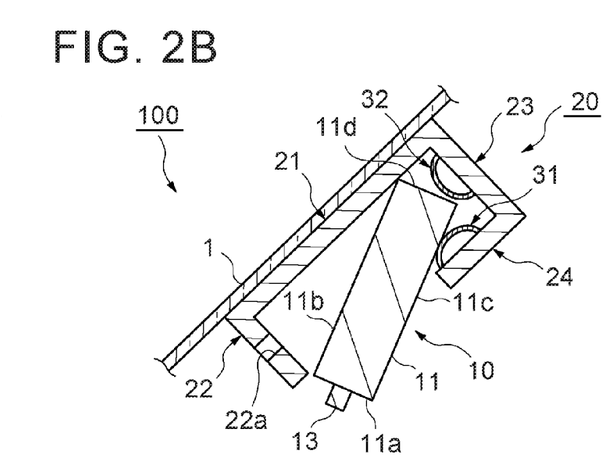
FIG. 2B is a view explaining the method for mounting the on-vehicle camera using the on-vehicle camera mounting structure shown in FIG. 1B.
Figure 2D:
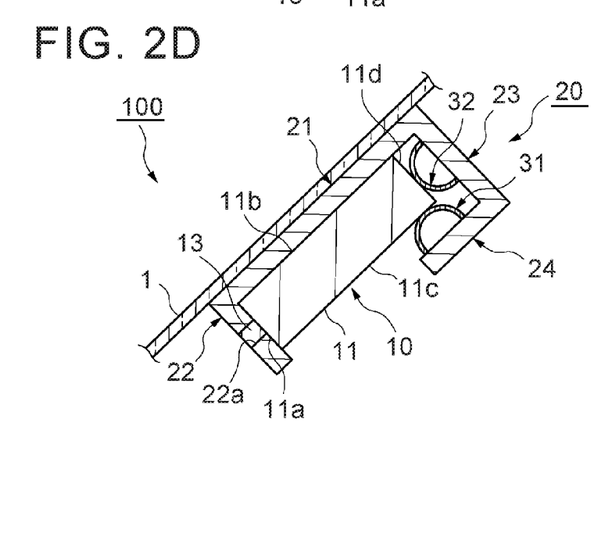
FIG. 2D is a view explaining the method for mounting the on-vehicle camera using the on-vehicle camera mounting structure shown in FIG. 1B.

FIG. 2A is a view explaining a method for mounting the on-vehicle camera 10 by using the on-vehicle camera mounting structure 100. FIG. 2B is a view explaining continuation of FIG. 2A. FIG. 2C is a view explaining continuation of FIG. 2B. FIG. 2D is a view explaining continuation of FIG. 2C. FIG. 2A to FIG. 2D show sections equal to the section shown in FIG. 1B.

When mounting the on-vehicle camera 10 on the window 1 by using the on-vehicle camera mounting structure 100, first, the confronting part 21 of the bracket 20 is adhered and fixed to the window 1 on the vehicle-interior side. As shown in FIG. 2A to FIG. 2D, while allowing the first spring part 31 and the second spring part 32 to be elastically deformed, the on-vehicle camera 10 is brought to enter the bracket 20 from the side surface 11d side of the on-vehicle camera 10. The side surface 11b of the on-vehicle camera 10 is brought into contact with the confronting part 21 of the bracket 20.

While inserting the projection 13 of the on-vehicle camera 10 into the through hole 22a of the bracket 20, the side surface 11a of the on-vehicle camera 10 is brought into contact with the front wall part 22 of the bracket 20. Thus, the on-vehicle camera 10 is housed in the bracket 20 fixed to the window 1, and the on-vehicle camera 10 is held on the confronting part 21, thereby mounting the on-vehicle camera 10 on the window 1.

At this time, due to the first spring part 31, force F1 in Z direction (see FIG. 1B) is applied onto the on-vehicle camera 10, the on-vehicle camera 10 is pressed against the confronting part 21, and the on-vehicle camera 10 is brought closer to the confronting part 21 and the window 1. Due to the second spring part 32, force F2 in X direction (see FIG. 1B) is applied onto the on-vehicle camera 10, and the on-vehicle camera 10 is pressed against the front wall part 22. As a result, it is ensured that the on-vehicle camera 10 is held by the bracket 20 so that the on-vehicle camera 10 does not move relative to the bracket 20 due to vibration and so on while the vehicle V is running. Further, as the projection 13 is fitted into the through hole 22a, movement of the on-vehicle camera 10 relative to the bracket 20 is regulated, thereby positioning the on-vehicle camera 10.

As described so far, in the on-vehicle camera mounting structure 100, the first spring part 31 applies force F1 in Z direction onto the on-vehicle camera 10, thereby bringing the on-vehicle camera 10 closer to the confronting part 21 of the bracket 20. Compared to the case where force in the direction away from the window 1 is applied onto the on-vehicle camera 10, it is possible to restrain expansion of a space between the confronting part 21 and the on-vehicle camera 10. Thus, it is possible to restrain the on-vehicle camera 10 from being separated from the window 1. As a result, it is possible to restrain an influence of light as a disturbance from the vehicle interior on the on-vehicle camera 10. For example, it is possible to restrain light directed from an instrument panel and so on towards the window 1 from being reflected on the on-vehicle camera 10 by the window 1.

Figure 3A:
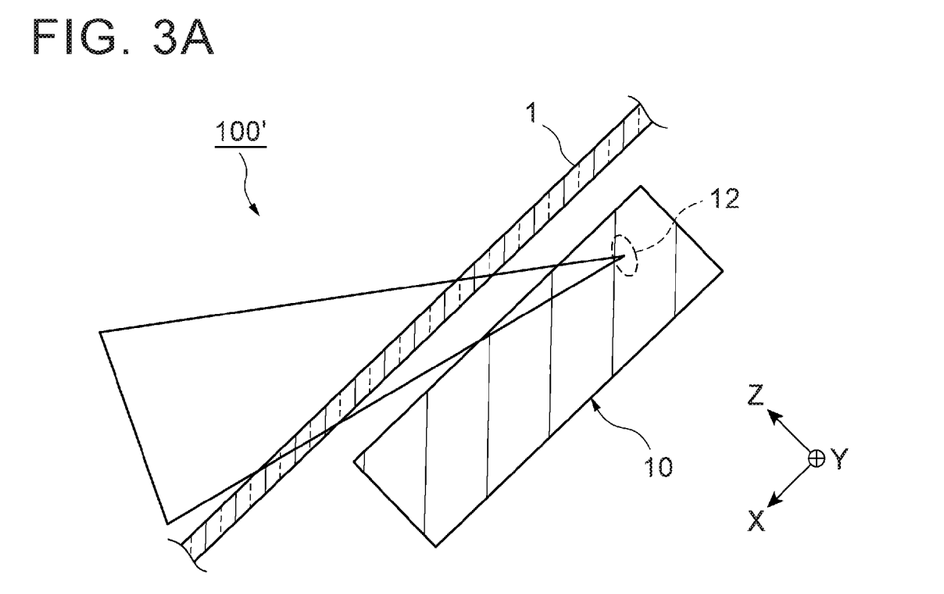
FIG. 3A is a schematic view explaining the on-vehicle camera mounting structure shown in FIG. 1B.
Figure 3B:
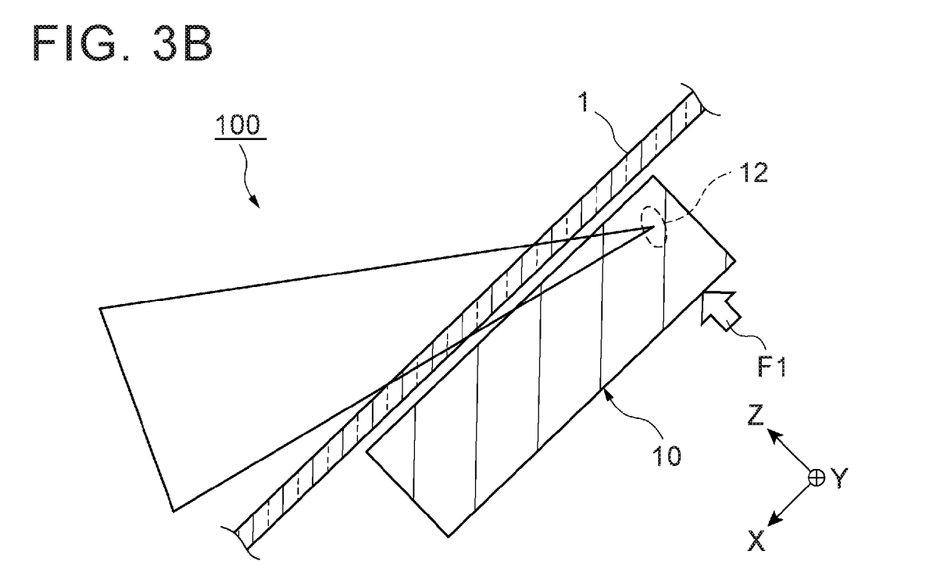
FIG. 3B is a schematic view explaining the on-vehicle camera mounting structure shown in FIG. 1B.

FIG. 3A is a schematic view explaining a conventional on-vehicle camera mounting structure 100'. FIG. 3B is a schematic view explaining the on-vehicle camera mounting structure 100 according to this embodiment. As shown in FIG. 3A and FIG. 3B, according to the on-vehicle camera mounting structure 100, it is possible to move the on-vehicle camera 10 closer to the window 1 in comparison with the conventional mounting structure 100', thereby reducing a distance of the on-vehicle camera 10 from the window 1.

In the on-vehicle camera mounting structure 100, the bracket 20 includes the rear wall part 23 and the vehicle-interior side supporting part 24, and the first spring part 31 is arranged between the on-vehicle camera 10 and the vehicle-interior side supporting part 24. With this structure, the foregoing operation, namely, application of force in a direction towards the window 1 from the first spring part 31 onto the on-vehicle camera 10 so as to bring the on-vehicle camera 10 closer to the confronting part 21 of the bracket 20, is concretely realized.

In the on-vehicle camera mounting structure 100, a spring part, which applies force on the on-vehicle camera in a direction away from the window 1, is not provided between the on-vehicle camera 10 and the confronting part 21. The confronting part 21 abuts on the side surface 11b of the on-vehicle camera 10 on the vehicle-exterior side. With this structure, no space is formed between the confronting part 21 and the on-vehicle camera 10, and it is thus possible to bring the on-vehicle camera 10 even closer to the window 1.

It is possible to further restrain an influence of light as a disturbance from the vehicle interior on the on-vehicle camera 10.

In the on-vehicle camera mounting structure 100, the first spring part 31 applies force F1 onto the surface of the camera housing 11 of the on-vehicle camera 10 on the vehicle-interior side, and it is thus possible to press the on-vehicle camera 10 so that the on-vehicle camera 10 is brought closer to the confronting part 21.

In the on-vehicle camera mounting structure 100, the on-vehicle camera 10 is pressed by the first spring part 31 in Z direction, and the confronting part 21 of the bracket 20 regulates movements of the on-vehicle camera 10 in Z direction. This means that the confronting part 21 structures a regulating part that regulates movement of the on-vehicle camera 10 in Z direction. In other words, the confronting part 21 functions as a stopper for the on-vehicle camera 10 in Z direction. The front wall part 22 of the bracket 20 structures a regulating part that regulates movements of the on-vehicle camera 10 in X direction. In other words, the front wall part 22 functions as a stopper for the on-vehicle camera 10 in X direction. The through hole 22a of the front wall part 22 structures a regulating part that regulates movements of the on-vehicle camera 10 in Z direction. In other words, the through hole 22a functions as a stopper for the on-vehicle camera 10 in Z direction.

Figure 4:
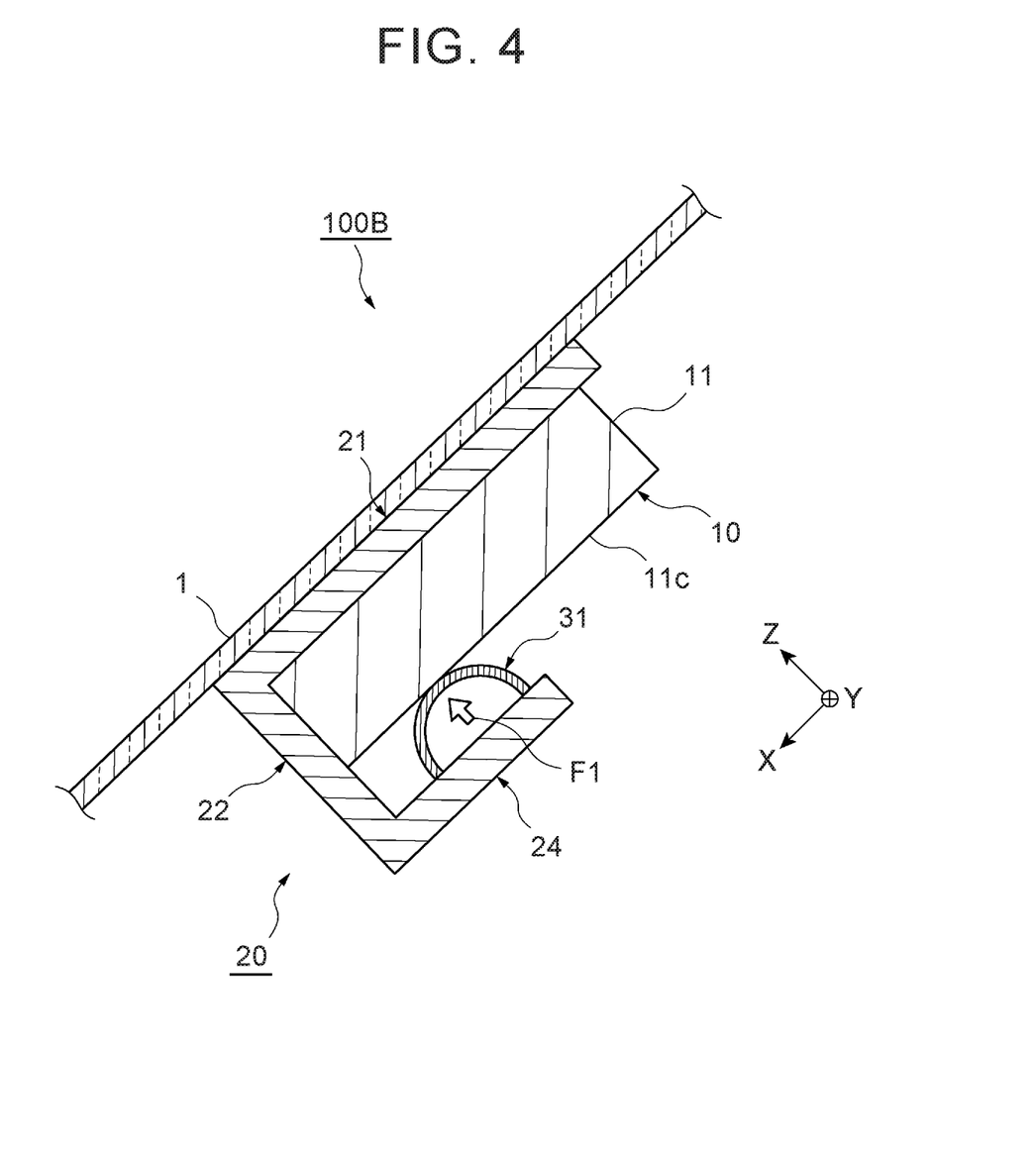
FIG. 4 is a sectional view of a modified example of the on-vehicle camera mounting structure shown in FIG. 1B.

FIG. 4 is a sectional view of an on-vehicle camera mounting structure 100B according to a modified example. FIG. 4 shows a section equal to the section shown in FIG. 1B. As shown in FIG. 4, the on-vehicle camera mounting structure 100B is not provided with a second spring part 32 (see FIG. 1B). An on-vehicle camera 10 is not provided with a projection 13, and a through hole 22a (see FIG. 1B) is not formed in a front wall part 22 of a bracket 20. In the on-vehicle camera mounting structure 100B, the bracket 20 is not provided with a rear wall part 23, and a vehicle-interior side supporting part 24 is provided in an end part of the front wall part 22 on the vehicle-interior side. An illustrated first spring part 31 applies force F1 in Z direction onto a front side of a side surface 11c of a camera housing 11, thereby bringing the on-vehicle camera 10 closer to a confronting part 21. The front wall part 22 of the on-vehicle camera mounting structure 100B structures a first wall part.

Next, an on-vehicle camera mounting structure according to the second embodiment is explained. Herein below, explanation duplicated with the foregoing first embodiment may be omitted.

Figure 5:
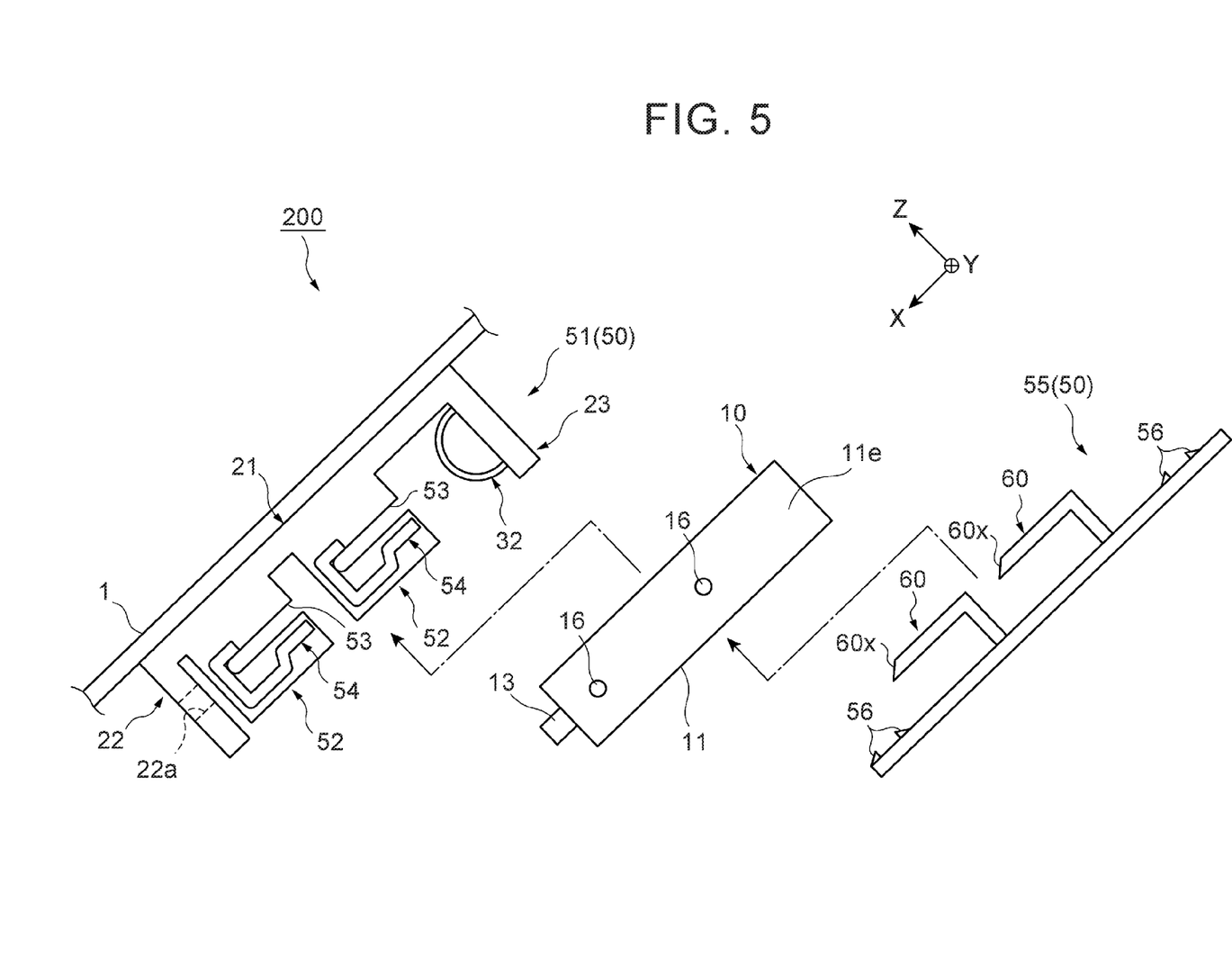
FIG. 5 is an exploded side view of an on-vehicle camera mounting structure according to another embodiment of the invention.
Figure 6A:
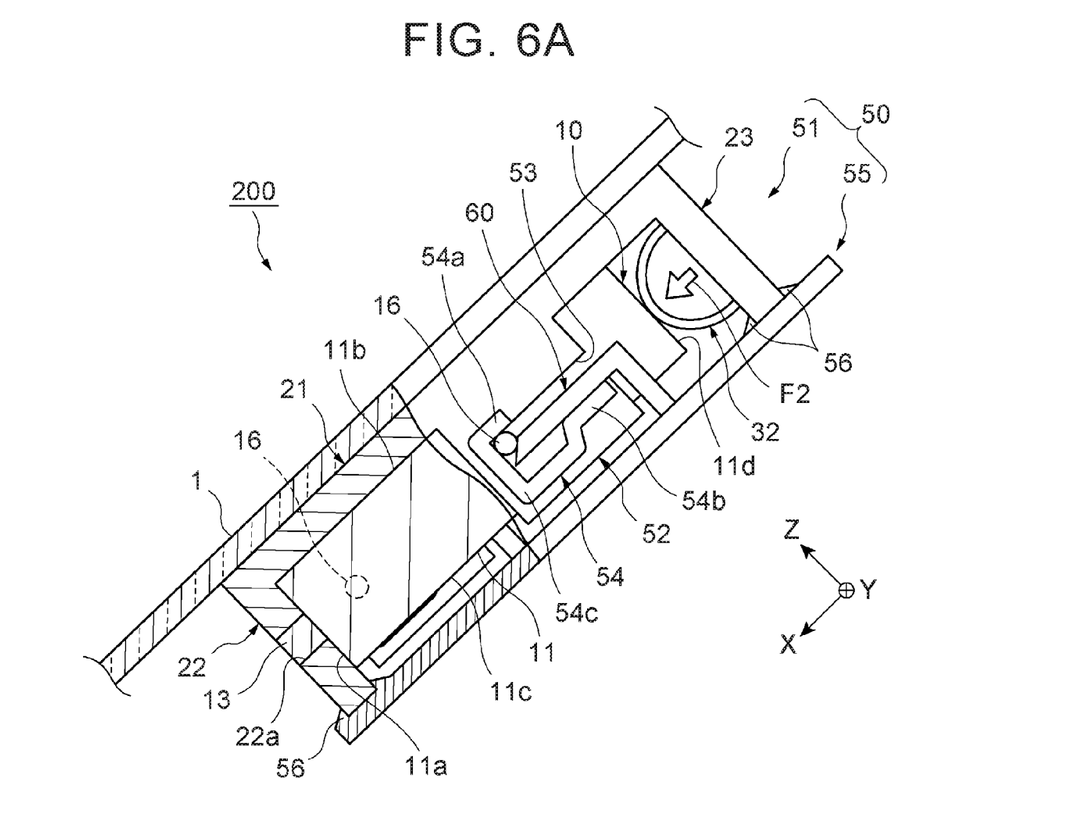
FIG. 6A is a view of the on-vehicle camera mounting structure shown in FIG. 5.
Figure 6B:
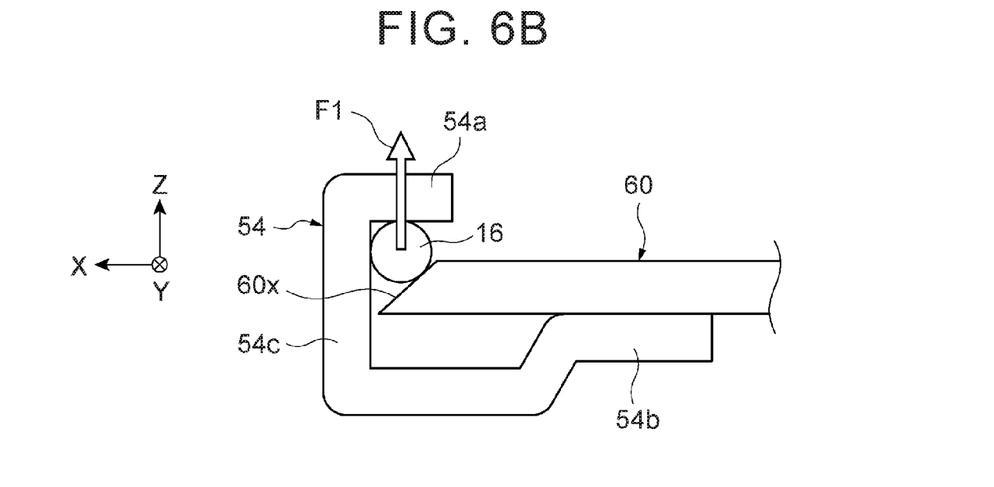
FIG. 6B is a view of the on-vehicle camera mounting structure shown in FIG. 5.

FIG. 5 is an exploded side view of an on-vehicle camera mounting structure 200 according to the second embodiment. FIG. 6A is a partial sectional view of an on-vehicle camera mounting structure 200. FIG. 6B is an enlarged side view of a main part of the on-vehicle camera mounting structure 200. FIG. 6A shows a section equal to the section shown in FIG. 1B.

As shown in FIG. 5 and FIG. 6A, the on-vehicle camera mounting structure 200 is provided with a bracket 50, which is made from a plurality of components, instead of the bracket 20. The on-vehicle camera mounting structure 200 is provided with first spring parts (spring parts) 60 as resin springs, instead of the first spring part 31. In a camera housing 11 of an on-vehicle camera 10, a plurality of projections 16 are formed. The projections 16 are provided on each of the side surfaces 11e that face each other in a vehicle width direction. The projections 16 project along Y direction. The projections 16 are engaged with the bracket 50. Force is applied onto the projections 16 from the first spring part 60.

The bracket 50 has a body part 51 and a latch part 55 that are made by resin molding. The bracket 50 is made by coupling the body part 51 and the latch part 55 with each other in a detachable manner. Inside the body part 51, the on-vehicle camera 10 is housed. The body part 51 is structured by including a confronting part 21, a front wall part 22, a rear wall part 23, and sidewall parts 52.

The side wall parts 52 are provided on both end parts of the confronting part 21 in the vehicle width direction so that the side wall parts 52 face each other. The side wall parts 52 are provided to be perpendicular to the confronting part 21. The side wall parts 52 are provided so as to be perpendicular to the front wall part 22 and the rear wall part 23. A space between the side wall parts 52 that face each other in the vehicle width direction corresponds to a width of the on-vehicle camera 10 in the vehicle width direction. The on-vehicle camera 10 is arranged and fitted between the pair of side wall parts 52. The pair of side wall parts 52 structure a regulating part that regulates movements of the on-vehicle camera 10 in Y direction. In other words, the side wall parts 52 function as a stopper for the on-vehicle camera 10 in Y direction.

In the side wall part 52, slits 53 are formed, which are open on a rear side. The slits 53 extend in X direction. The slits 53 allow the projections 16 of the on-vehicle camera 10 to pass through, and are also engaged with the projections 16. The slits 53 have a width that allows the projections 16 to pass through. Inner surfaces of the slits 53 support the on-vehicle camera 10 through the projections 16 in Z direction. The slits 53 structure a regulating part that regulates movements of the on-vehicle camera 10 in Z direction. In other words, the slits 53 function as a stopper for the on-vehicle camera 10 in Z direction.

On side surfaces of the side wall parts 52 on outer sides in the vehicle width direction, projecting wall parts 54 are provided, projecting to the outer sides. The illustrated projecting wall parts 54 extend into a C shape that is open on the rear side. In other words, the projecting wall parts 54 extend into a U-shape that is open on the rear side. The projecting wall parts 54 first extend along X direction from the rear side to the front side, and then extend so as to bend towards the rear side. The projecting wall parts 54 extend so as to surround bottom parts (end parts on the front side) of the slits 53. The projecting wall parts 54 have a projecting height corresponding to the height of the projections 16 of the on-vehicle camera 10.

The projecting wall part 54 includes a projection receiving part 54a that is in contact with the projection 16, a spring receiving part 54b that is in contact with the first spring part 60, and a connecting part 54c that connects the projection receiving part 54a and the spring receiving part 54b with each other. The projection receiving part 54a and the spring receiving part 54b extend in X direction in a side view. The spring receiving part 54b is arranged so as to be separated from the projection receiving part 54a in the vehicle-interior side and the rear side. In a side view, the connecting part 54c continues from a front side of the projection receiving part 54a and also continues form a front side of the spring receiving part 54b through a step. The illustrated connecting part 54c extends as stated below in a side view. The connecting part 54c extends along Z direction from a front end of the projection receiving part 54a towards the vehicle-interior side, is bent at a right angle to the rear side and extends along X direction. Then, after extending to the vehicle-exterior side in an inclined manner, the connecting part 54c continues to the front end of the spring receiving part 54b.

The latch part 55 has a structure that is detachable from the body part 51. The latch part 55 includes pawl parts 56. The latch part 55 is fixed to the body part 51 in the detachable manner by allowing the pawl parts 56 to be caught on (engaged with) the body part 51. The latch part 55 includes the first spring parts 60.

The first spring part 60 is a plate spring having a plate shape. The illustrated first spring part 60 extends into an L shape in a side view. The first spring part 60 includes a proximal end part extending in Z direction, and a tip part extending in X direction from an end part of the proximal end part. A tip end surface of the first spring part 60 is formed into an inclined surface 60x. The inclined surface 60x is inclined to the vehicle-interior side in parallel to Y direction and towards X direction. The inclined surface 60x has a shape that is made by cutting out a corner part of the first spring part 60 on the front side and the vehicle-exterior side. The inclined surface 60x intersects with X direction and Y direction.

The tip part of the first spring part 60 is arranged between the projection 16 of the on-vehicle camera 10 and the spring receiving part 54b of the projecting wall part 54. The first spring part 60 is provided so as to be deformed elastically along Z direction. The first spring part 60 applies force F1 in Z direction, which is restoring force of the first spring part 60, onto the projection 16 of the on-vehicle camera 10.

The first spring part 60 is sandwiched between the projection 16 and the spring receiving part 54b, and is deformed elastically so that the first spring part 60 on the inclined surface 60x side is bent towards the vehicle-interior side. The first spring part 60 applies force F1 in Z direction, which is restoring force in accordance with the elastic deformation, onto the projection 16. The first spring part 60 applies force F1 in Z direction onto the projection 16, and brings the on-vehicle camera 10 closer to the confronting part 21. The first spring part 60 applies force in a direction away from the window 1 onto the spring receiving part 54b as reaction force of force F1 applied onto the on-vehicle camera 10.

As shown in FIG. 6A and FIG. 6B, the on-vehicle camera 10 is housed in the body part 51 that is fixed to the window 1 on the vehicle-interior side. The latch part 55 is fixed to the body part 51 in a detachable manner. A projection 13 of the on-vehicle camera 10 is fitted into a through hole 22a of the front wall part 22 of the bracket 50. A second spring part 32 applies force F2 in X direction onto the on-vehicle camera 10 and presses the on-vehicle camera 10 against the front wall part 22.

The projection 16 of the on-vehicle camera 10 is brought into the slit 53 of the side wall part 52 of the bracket 50, and is engaged with the slit 53. The projection 16 projects outside from the side wall part 52 through the slit 53, and is exposed from the side wall part 52. The projection 16 is positioned inside the projecting wall part 54 on the vehicle-exterior side (the projection receiving part 54a side). The first spring part 60 enters the projecting wall part 54 between the projection 16 and the spring receiving part 54b from the rear side.

The first spring part 60 applies force F1 in Z direction onto the projection 16, thereby bringing the on-vehicle camera 10 closer to the confronting part 21. The projection 16 is pressed by the first spring part 60 against the projection receiving part 54a. At this time, the inclined surface 60x of the first spring part 60 comes into contact with the projection 16 on the vehicle-interior side. The projection receiving part 54a comes into contact with the projection 16 on the vehicle-exterior side. The spring receiving part 54b is in contact with a part of the first spring part 60, which is away from the front end by a given length.

As described so far, in the on-vehicle camera mounting structure 200, the first spring part 60 applies force F1 in Z direction onto the on-vehicle camera 10, thereby bringing the on-vehicle camera 10 closer to the confronting part 21 of the bracket 50. This restrains expansion of a space between the confronting part 21 of the bracket 50 and the on-vehicle camera 10, thereby restraining the on-vehicle camera 10 from being separated from the window 1. It becomes possible to restrain an influence of light as a disturbance from the vehicle interior on the on-vehicle camera 10.

In the on-vehicle camera mounting structure 200, the first spring part 60 applies force F1 in Z direction onto the projection 16 of the on-vehicle camera 10. Thus, it is possible to press the on-vehicle camera 10 so that the on-vehicle camera 10 is brought closer to the confronting part 21 of the bracket 50.

The embodiments of the invention have been described so far. However, the invention is not limited to the foregoing embodiments and is carried out in various forms. In the foregoing embodiments, as long as the on-vehicle camera 10 is brought closer to the confronting part 21, force F1 in Z direction may be applied to any position in the on-vehicle camera 10.

The confronting part 21 may not be provided. Any form may be used as long as the first spring part 31 applies force onto the on-vehicle camera 10 so that the on-vehicle camera 10 is brought closer to the window 1.

What is claimed is:

1. An on-vehicle camera mounting structure comprising:
a bracket arranged on a window;
a first spring part that is arranged in the bracket and applies force in a direction towards the window onto an on-vehicle camera; and
a second spring part,
wherein the bracket includes a first wall part extending parallel to a surface of the window, and the on-vehicle camera is provided between the window and the first wall part, and the first spring part is arranged between the on-vehicle camera and the first wall part,
wherein the bracket further includes a second wall part extending in a direction orthogonal to the window,
wherein the first wall part that is connected to an end part of the second wall part at a side that does not contact the window on a vehicle-interior side, extends along the window, and is positioned on the vehicle-interior side of the on-vehicle camera, and
wherein the second spring part is arranged between the on-vehicle camera and the second wall part.

2. The on-vehicle camera mounting structure according to claim 1, wherein
the bracket includes a confronting part that is fixed to the window on a vehicle-interior side, faces the window, and extends along the window.

* * * * *